United States Patent
Stefanon

(10) Patent No.: US 7,798,550 B2
(45) Date of Patent: Sep. 21, 2010

(54) FOLDABLE FEET SUPPORTS FOR REMOVABLE VEHICLE SEATS

(75) Inventor: Heraldo Felicio Stefanon, Huntington Beach, CA (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 468 days.

(21) Appl. No.: 11/881,866

(22) Filed: Jul. 30, 2007

(65) Prior Publication Data

US 2009/0033122 A1 Feb. 5, 2009

(51) Int. Cl.
*B60N 2/02* (2006.01)
(52) U.S. Cl. ............................................. 296/65.03
(58) Field of Classification Search .......... 296/65.01, 296/65.03; 297/344.1; 248/503.1
See application file for complete search history.

(56) References Cited

U.S. PATENT DOCUMENTS

| | | | |
|---|---|---|---|
| 1,693,633 A * | 12/1928 | Allen | 280/31 |
| 1,727,335 A * | 9/1929 | Chatfield | 280/31 |
| 1,967,332 A * | 7/1934 | Smith | 182/15 |
| 2,589,922 A | 3/1952 | Bowman | |
| 4,157,797 A * | 6/1979 | Fox | 244/122 R |
| 4,872,693 A * | 10/1989 | Kennel | 280/30 |
| 4,878,680 A * | 11/1989 | Molnar | 280/30 |
| 5,372,398 A * | 12/1994 | Aneiros et al. | 296/65.03 |
| 5,454,624 A | 10/1995 | Anglade et al. | |
| 5,474,311 A | 12/1995 | Tyciak et al. | |
| 5,547,242 A * | 8/1996 | Dukatz et al. | 296/65.03 |
| 5,944,388 A | 8/1999 | Saucier et al. | |
| 5,997,069 A | 12/1999 | Coffey et al. | |
| 6,010,296 A * | 1/2000 | Enders | 414/346 |
| 6,012,755 A | 1/2000 | Hecht et al. | |
| 6,036,252 A * | 3/2000 | Hecksel et al. | 296/65.03 |
| 6,375,246 B1 * | 4/2002 | Nicola et al. | 296/65.03 |
| 6,478,267 B1 | 11/2002 | Whitman et al. | |
| 7,073,838 B2 * | 7/2006 | Lee | 296/65.03 |
| 2003/0122407 A1 | 7/2003 | Boyd et al. | |

* cited by examiner

*Primary Examiner*—H Gutman
(74) *Attorney, Agent, or Firm*—Dinsmore & Shohl LLP

(57) ABSTRACT

Removable vehicle seats operable for use outside of vehicles include a latching mechanism and a plurality of legs. The plurality of legs can be configured to extend when the latching mechanism is released from the vehicle and to support the removable vehicle seat when the removable vehicle seat is placed on a surface outside of the vehicle.

19 Claims, 7 Drawing Sheets

FOLDABLE FEET SUPPORTS FOR REMOVABLE VEHICLE SEATS

TECHNICAL FIELD

This invention generally relates to removable vehicle seats operable for use outside of vehicles.

BACKGROUND

Some vehicles are provided with one or more seats that typically are used for passenger travel that are removable from the vehicle. Users of such vehicle seats remove the seat and place the seat on a surface outside of the vehicle to provide outside seating. Simply placing these removable seats on the ground or other surface, however, may result in damage to latching mechanisms located on the underside of the seat that are used to secure the seat to the floor of the vehicle. Such damage may prevent or hinder the re-securing of the latching mechanism, and, thus, the seat, to the vehicle floor.

Further, when such seats are removed from the vehicle, the latching mechanisms are used to support the seat on the ground surface. Typically, the latching mechanisms are not configured for this purpose and often results in poor stability and support of the seat on the ground surface as well as uncomfortable seating conditions for a person sitting on the seat outside of the vehicle. Accordingly, there is a need for a removable vehicle seat that comprises a plurality of legs configured to support the removable vehicle seat when the seat is placed on a surface outside of the vehicle.

SUMMARY

According to one embodiment, a removable vehicle seat operable for use outside of a vehicle can comprise a latching mechanism disposed on an underside of the removable vehicle seat. The latching mechanism can be configured to releasably engage a seat mounting member of the vehicle, the seat mounting member being secured to a floor of the vehicle. The removable vehicle seat can further comprise a plurality of legs disposed on the underside of the removable vehicle seat. The plurality of legs can be configured to support the removable vehicle seat when the removable vehicle seat is placed on a surface outside of the vehicle.

According to another embodiment, a removable vehicle seat operable for use outside of a vehicle can comprise a latching mechanism disposed on an underside of the removable vehicle seat. The latching mechanism may be configured to releasably engage a seat mounting member of the vehicle, the seat mounting member being secured to a floor of the vehicle. The removable vehicle seat may further comprise a plurality of legs rotatably disposed on the underside of the removable vehicle seat. The plurality of legs may be configured to extend after the latching mechanism is released from the seat mounting member and to fold before the latching mechanism engages the seat mounting member. The plurality of legs may be configured to support the removable vehicle seat when the removable vehicle seat is placed on a surface outside of the vehicle.

According to another embodiment, a removable vehicle seat operable for use outside of a vehicle can comprise a latching mechanism disposed on an underside of the removable vehicle seat. The latching mechanism can comprise a latch, a base, and a hinge. The latch may be configured to releasably engage a seat mounting member of the vehicle, the seat mounting member being secured to a floor of the vehicle. The base may be configured to support the removable vehicle seat when the removable vehicle seat is placed on a surface outside of the vehicle. The hinge can couple the latching mechanism to the underside of the removable vehicle seat and can couple the latch and the base. The hinge may be configured such that the latch rotates in an upward direction and the base rotates in a downward direction after the latch is released from the seat mounting member and such that the latch rotates in a downward direction and the base rotates in an upward direction before the latch engages the seat mounting member.

According to another embodiment, a vehicle can comprise an embodiment of a removable vehicle seat operable for use outside of the vehicle.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Figure 2:
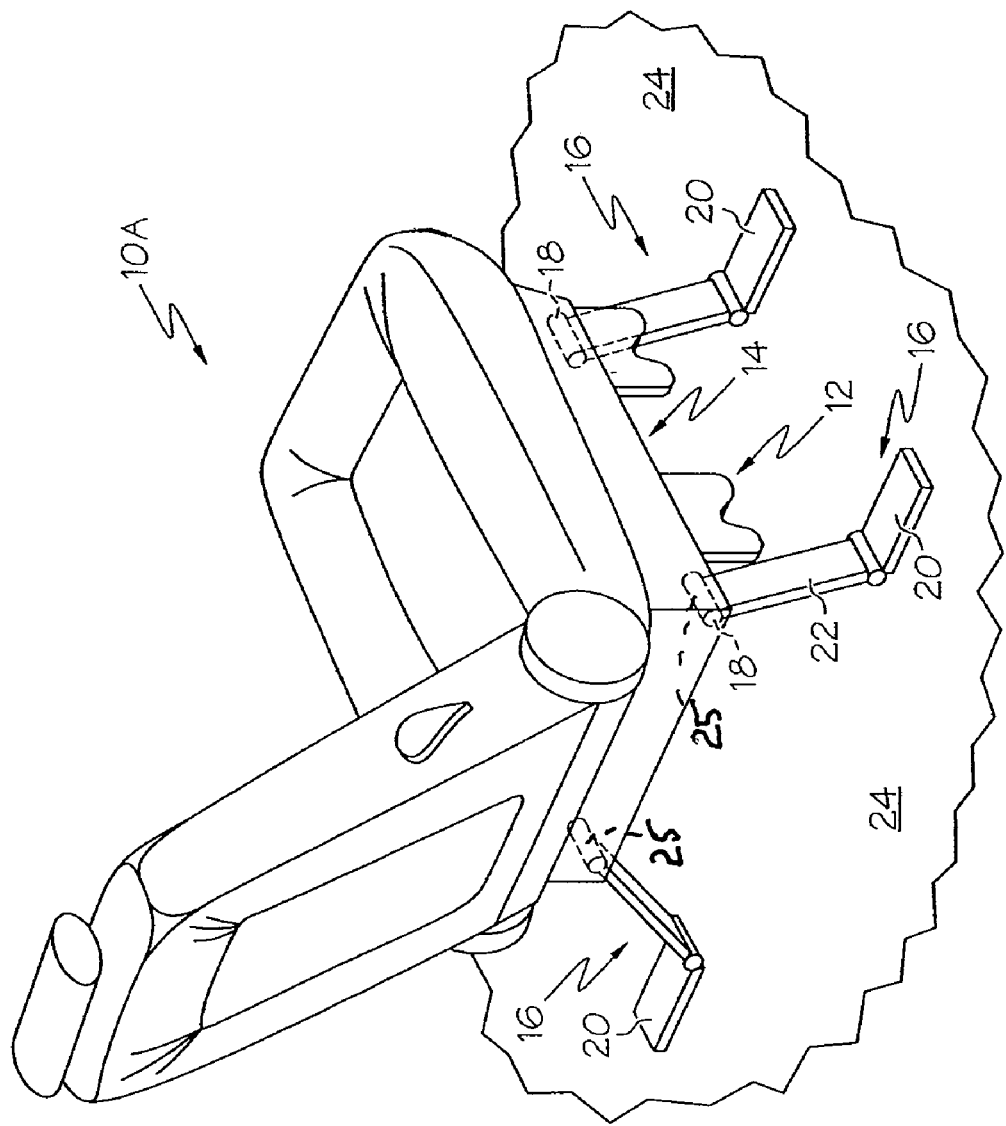
FIG. 2 is an illustration depicting an exemplary removable vehicle seat, in accordance with one embodiment of the present invention.
Figure 3:
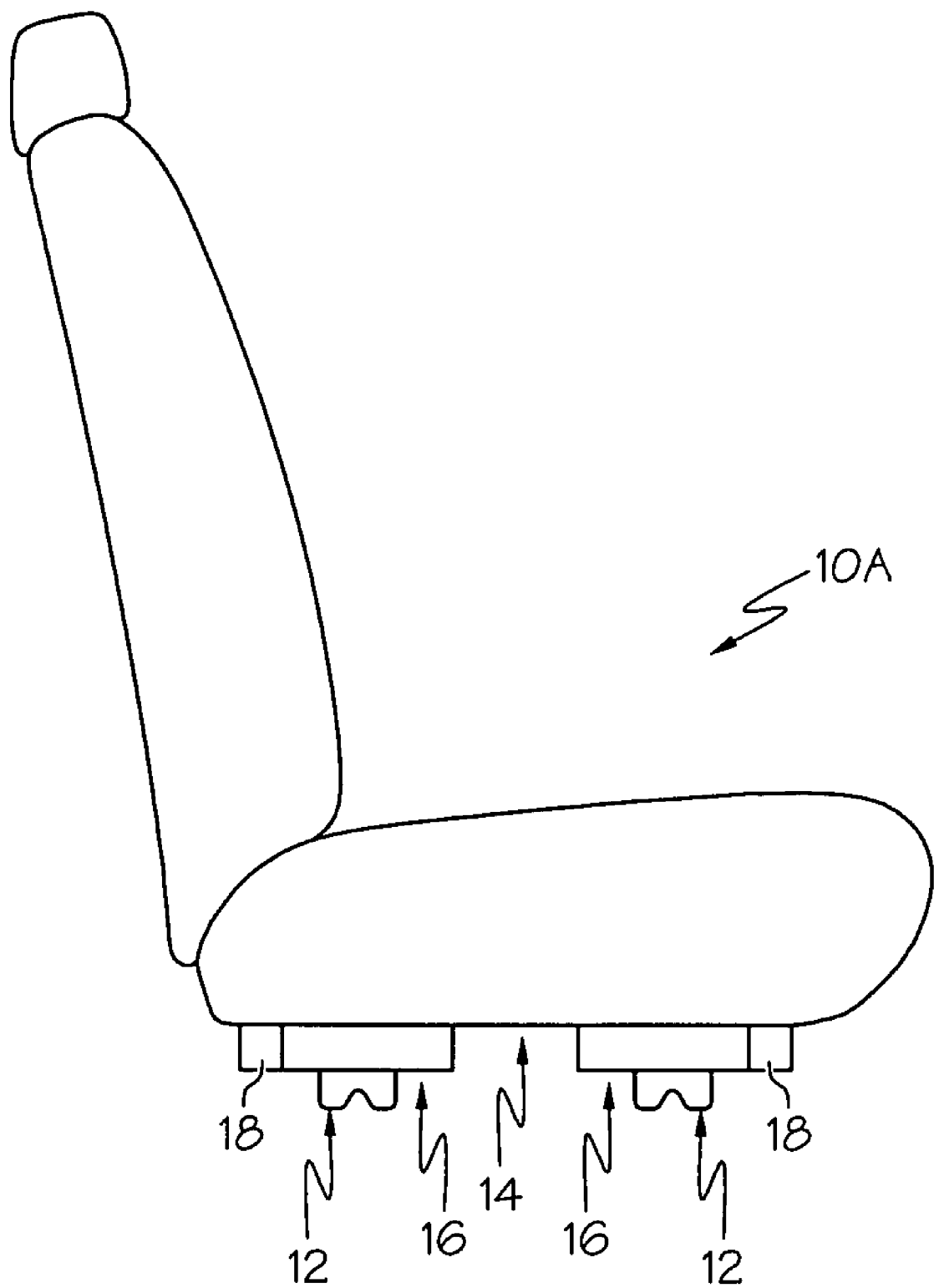
FIG. 3 is an illustration depicting a side view of an exemplary removable vehicle seat, in accordance with one embodiment of the present invention.
Figure 7:
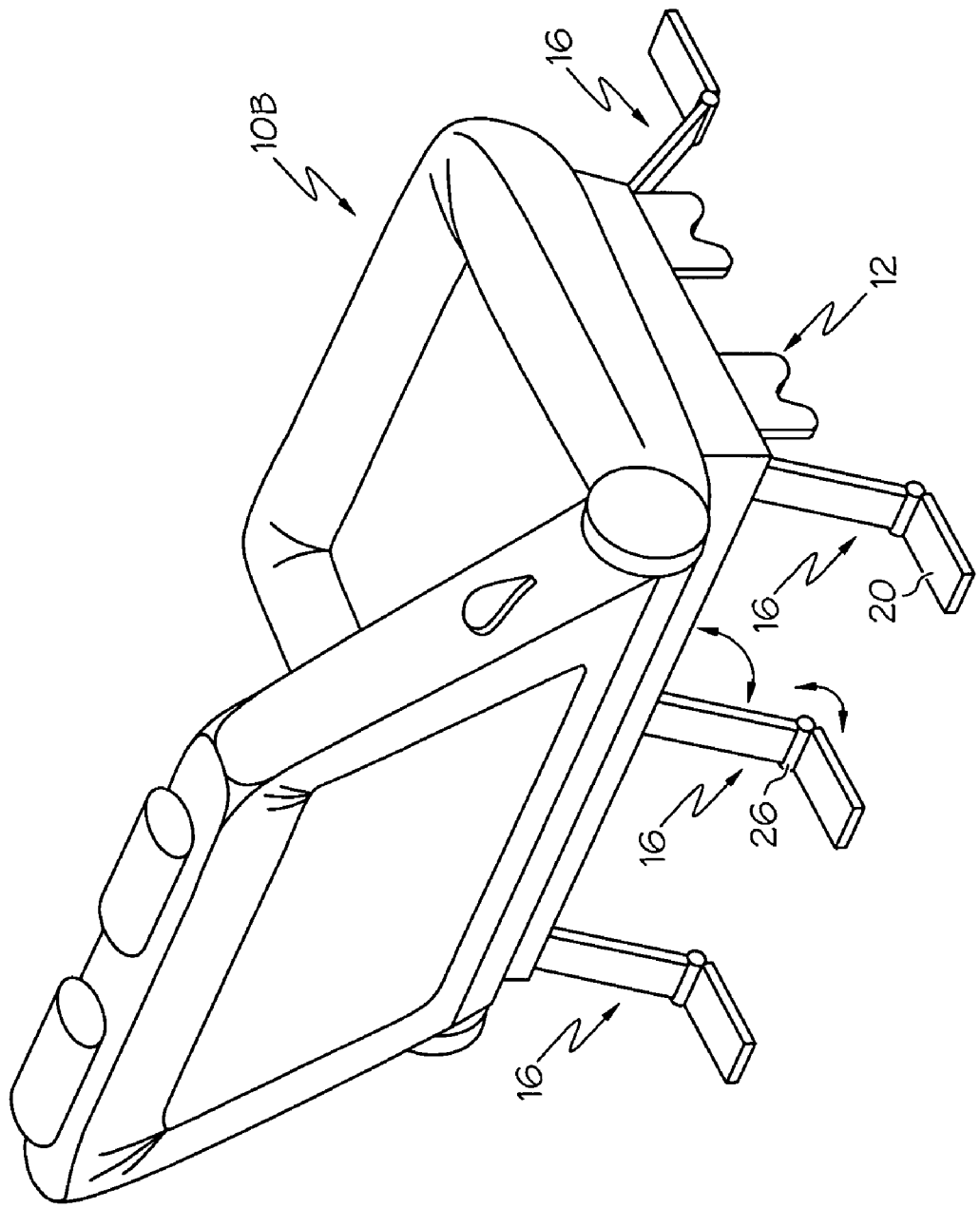
FIG. 7 is an illustration depicting an exemplary removable vehicle seat, in accordance with one embodiment of the present invention.

Referring to the figures in detail, FIGS. 2 and 7 illustrate two embodiments of a removable vehicle seat 10A, 10B operable for use outside of a vehicle. As depicted in FIGS. 2 and 7, the removable vehicle seat 10A/B can comprise a latching mechanism 12 and a plurality of legs 16.

The removable vehicle seat 10A can comprise a size sufficient to allow a passenger to sit on the removable seat 10A, while removable vehicle seat 10B can comprise a size sufficient to allow more than one passenger to sit on the seat 10B. When the passenger exits the vehicle, the passenger can remove the seat 10A/B from the vehicle by releasing the latching mechanism 12 from a seat mounting member of the vehicle. As the passenger releases the latching mechanism 12 from the seat mounting member, the plurality of legs 16 can extend so as to support the seat 10A/B on a surface 24 outside of the vehicle. More particularly, the plurality of legs 16 can be configured to extend when the latching mechanism 12 is released from the seat mounting member and to fold before the latching mechanism 12 engages the seat mounting member. After the plurality of legs 16 have been extended, the passenger can then place the seat 10A/B on a surface 24 outside of the vehicle.

The latching mechanism 12 generally is disposed on an underside 14 of the removable seat 10A/B. As mentioned above, the latching mechanism 12 can be configured to releasably engage a seat mounting member of the vehicle. Generally, this seat mounting member is secured to a floor of the vehicle. Thereby, the latching mechanism 12 and the seat 10A/B itself are secured to the vehicle for passenger travel inside of the vehicle when the latching mechanism 12 is engaged with the seat mounting member. The latching mechanism 12 and the seat 10A/B can be removed from the vehicle when the latching mechanism 12 is released of its engagement with the seat mounting member. This releasing of the latching mechanism from the seat mounting member can vary according to the model and/or the manufacturer of the vehicle in which the removable seat 10A/B is installed.

In one embodiment, the latching mechanism 12 can be configured as a releasable latch configured to releasably secure to a seat mounting member, which may be configured as a loop projecting in an upward direction from the floor of the vehicle. However, any conventional device configured to secure and release a seat with a vehicle can be used. Further, it is contemplated that there can be more than one latching mechanism 12 and/or seat mounting member and can be determined according the vehicle manufacturer's specifications.

The plurality of legs 16 can be disposed on the underside 14 of the removable seat 10A/B. More particularly, the plurality of legs 16 can be disposed in front of or behind the latching mechanism 12 on the underside 14 of the seat 10A/B, according to the specifications of the manufacturer of the vehicle and/or seat. In accordance with one embodiment, the plurality of legs 16 comprises four legs. Each of these four legs can be disposed near each of four corners of the underside 14 of the removable seat 10A/B. It is contemplated that the plurality of legs 16 can comprise any number of legs 16 sufficient to support a person sitting on the removable seat 10A/B outside of the vehicle. For example, but not of limitation, the plurality of legs 16 can comprise two legs, each configured as a post comprising a perpendicular or arced base configured to support the removable seat 10A/B on the surface. Further, in accordance with another embodiment, shown in FIG. 7, the plurality of legs 16 comprises six legs. These six legs may be arranged as shown with one leg at each corner of the seat 10B and two legs at or near the center of the underside 14 of seat 10B. Other arrangements of the plurality of legs 16 are contemplated. The plurality of legs 16 may comprise a strength and a stability sufficient to support a person sitting on the removable seat 10A/B outside of the vehicle. The plurality of legs 16 may be configured of steel, aluminum, plastic, or other substance sufficient to provide the legs 16 with the desired strength and stability.

Figure 4A:
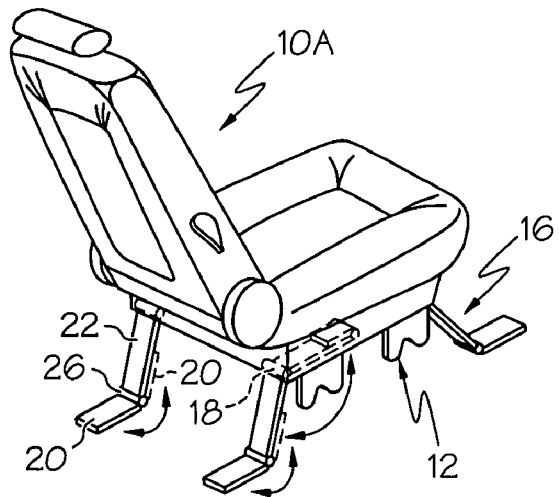
FIGS. 4A-4C are illustrations depicting exemplary removable vehicle seats, in accordance with one embodiment of the present invention.
Figure 4B:
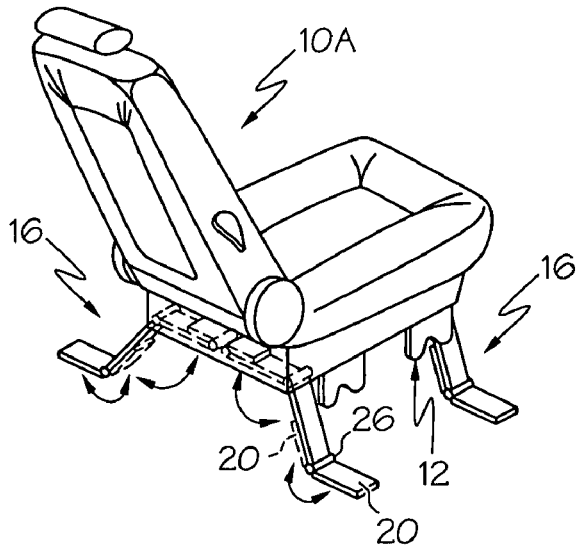

Further, each of the plurality of legs 16 can comprise a coupling mechanism 18. This coupling mechanism 18 can be configured to couple each of the plurality of legs 16 to the underside 14 of the removable seat 10A/B. More particularly, the underside 14 of the removable seat 10A/B may comprise one or more receptors, each configured to secure to a coupling mechanism 18. In accordance with one embodiment, the coupling mechanism 18 can be a hinge. As shown in FIGS. 4 and 6, embodiments of a removable seat 10A/B are illustrated where the plurality of legs 16 are rotatably secured to the underside 14 of the seat 10A/B by the coupling mechanism 18 configured as a hinge. It is contemplated that the coupling mechanism 18 can be one or more of any variety of devices configured to so couple the plurality of legs 16 to the underside 14 of the removable seat 10A/B and to permit the extending and the folding of the plurality of legs 16.

Figure 6A:
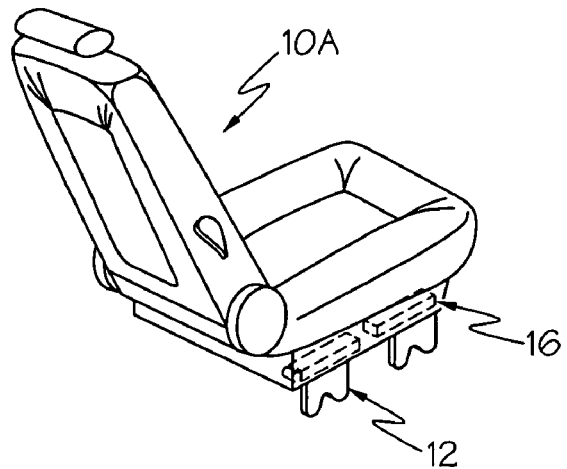
FIGS. 6A-6C are illustrations depicting exemplary removable vehicle seats, in accordance with one embodiment of the present invention.
Figure 6B:
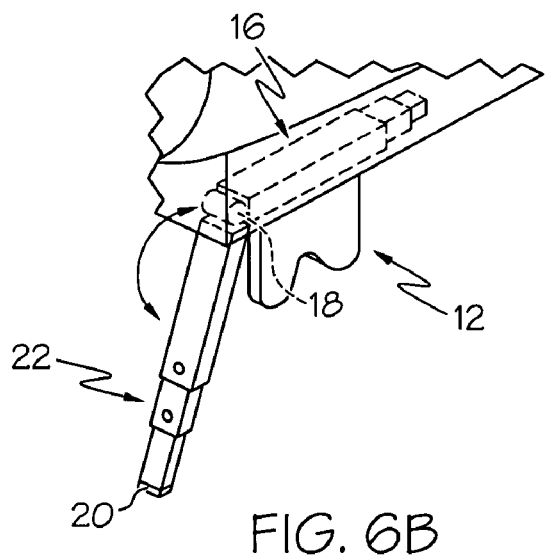
Figure 6C:
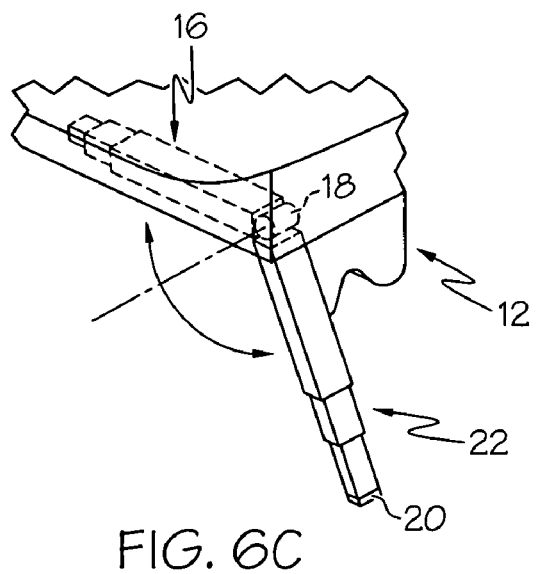

In addition, each of the plurality of legs 16 can comprise a base 20 and an extension 22, as shown in FIGS. 2 and 7. The base 20 can be configured to support each of the plurality of legs 16 and the removable seat 10A/B when the base 20 is placed on a surface 24 outside of the vehicle. The extension 22 can be configured to connect the base 20 and the coupling mechanism 18. Further, the extension 22 can be configured to define a length of each of the plurality of legs 16 and a height of the underside 14 of the removable seat 10A/B from the surface 24 outside of the vehicle. If accessed, this extension 22 can be adjustable so as to adjust the length of each of the plurality of legs 16 and the height of the underside 14 of the removable seat 10A/B from the surface 24 outside of the vehicle. For example, but not by way of limitation, the extension 22 may have a collapsible telescoping configuration, as shown in FIGS. 6A-6C.

Each of the plurality of legs 16 further can comprise a base hinge 26, as shown in FIGS. 4A-4C and FIG. 7. The base hinge 26 can be configured to connect the base 20 and the extension 22 in a manner such that the base 20 may fold behind the extension 22 when the leg is not fully extended. This configuration allows each of the plurality of legs 16 to fold more compactly when the removable seat 10A/B is positioned within a vehicle.

As mentioned above, the plurality of legs 16 can be configured to extend when the latching mechanism 12 is released for the seat mounting member and to fold before the latching mechanism 12 engages the seat mounting member. The folding of the plurality of legs 16 can be performed at any point before the latching mechanism engages the seat mounting member. For example, but not by way of limitation, a person can put the removable seat 10A/B on its side when the seat 10A/B is still outside of the vehicle to fold the plurality of legs 16 prior to lifting the removable seat 10A/B back into the vehicle.

Figure 4C:
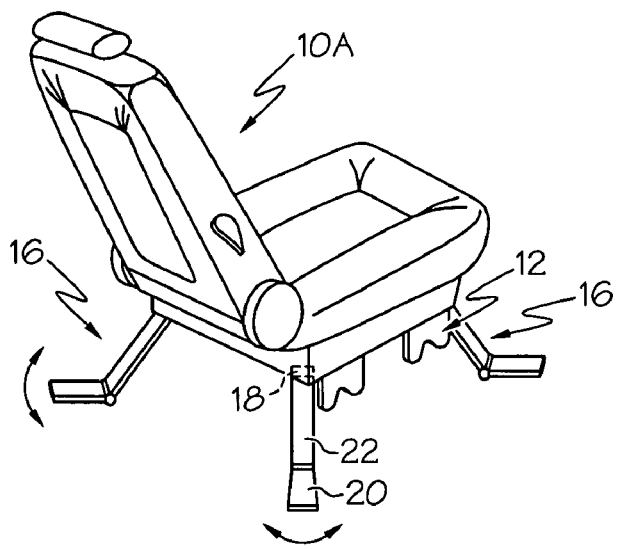
Figure 5A:
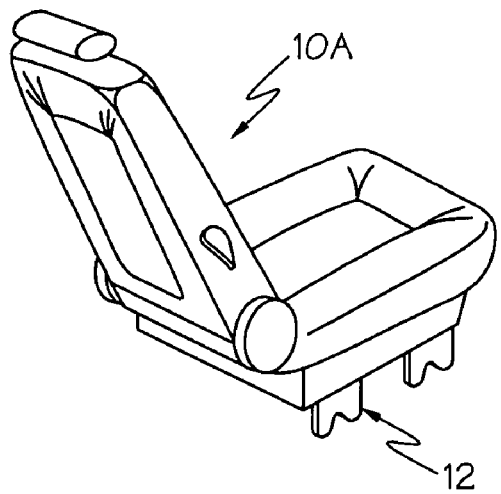
FIGS. 5A-5E are illustrations depicting exemplary removable vehicle seats, in accordance with one embodiment of the present invention.
Figure 5B:
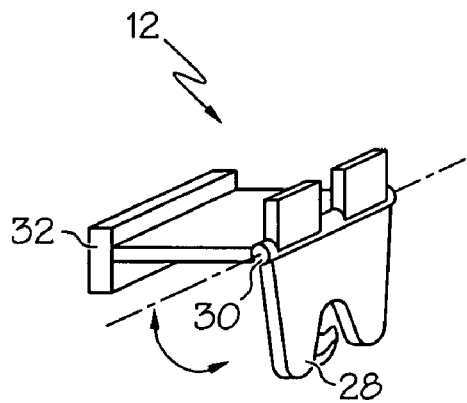
Figure 5C:
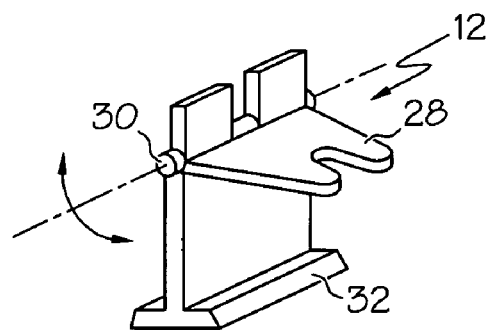
Figure 5D:
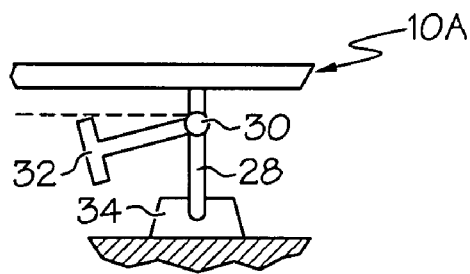
Figure 5E:
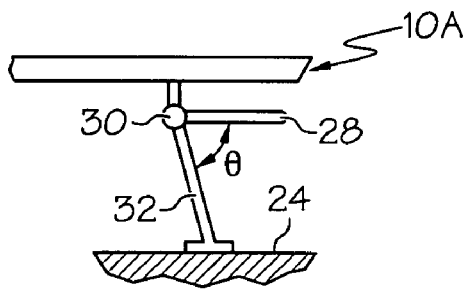

In accordance with one embodiment, each of the plurality of legs 16 can be configured to rotate at least partially around a respective lateral axis, as shown in FIGS. 4A-4C and 6A-6C. This lateral axis may be maintained by the coupling mechanism 18 described above, which may be secured to the underside 14 of the removable seat 10A/B by the receptor. The rotation of each of the plurality of legs 16 about the lateral axis permits each of the plurality of legs 16 to be configured to rotate in an downward direction when the latching mechanism 12 is released from the seat mounting member. In addition, each of the plurality of legs 16 can be configured to rotate in an upward direction before the latching mechanism 12 engages the seat mounting member. Further, in accordance with another embodiment, each of the plurality of legs 16 can be configured to rotate at least partially around a respective vertical axis, as shown in FIG. 4C. For example, but not by way of limitation, each of the plurality of legs 16 may be configured to rotate around a respective vertical axis up to 90 degrees so as to provide stable, comfortable seating on a variety of terrains.

In accordance with one embodiment, the extending and the folding of the plurality of legs 16 can be controlled by a spring mechanism represented by element 25. This spring mechanism 25 can comprise a spring configured to expand with the extending of the plurality of legs 16 and to contract with the folding of the plurality of legs 16. In accordance with another embodiment, the extending and the folding of the plurality of legs 16 can be controlled by a pump mechanism, such as, but not limited to, a pneumatic pump or shock. In accordance with yet another embodiment, the extending and the folding of the plurality of legs 16 can be controlled manually by a pushing or a pulling of the plurality of legs 16 in a desired direction. The removable seat 10A/B may further comprise one or more clasps, or other similar devices, that may be disposed on the underside 14 of the removable seat 10A/B. Each clasp may be configured to releasably secure a folding leg 16, such as at the base 20 or the extension 22, to the underside 14 of the removable seat 10A/B so as to prevent the legs 16 from extending prematurely or when the legs are intended to be folded.

The plurality of legs 16 can comprise a locked orientation and an unlocked orientation. The locked orientation may comprise the plurality of legs 16 locked in an extended downward position suitable for a person to sit on the removable seat 10A/B outside of the vehicle. The unlocked orientation can comprise the plurality of legs 16 unlocked from the extended downward position before the latching mechanism 12 engages the seat mounting member. It is also contemplated that the plurality of legs 16 can be configured to lock in, and unlock from, any position so desired, whether extended, partially extended, or folded. In one embodiment, the lock may be configured as a spring-based push button lock that may project with the full extension of the legs 16 to prevent the folding of the legs 16 when extended. This push button lock may be depressed by the user of the removable seat 10A/B when the user desires to fold the legs 16.

Generally, as shown in FIG. 2, the plurality of legs 16 can be configured to extend further than the latching mechanism 12 from the underside 14 of the removable seat 10A/B so as to substantially prevent the latching mechanism 12 from contacting the surface 24 when the removable seat 10A/B is placed on the surface 24 outside of the vehicle. Further, as shown in FIGS. 1, 3, 4A-4B, and 6A-6C, the plurality of legs 16 can be configured to fold underneath the underside 14 of the removable seat 10A/B beneath the latching mechanism so that the plurality of legs 16 do not contact the vehicle floor as the latching mechanism engages the seat mounting member.

In accordance with another embodiment, shown in FIGS. 5A-5E, a removable vehicle seat 10A may have a latching mechanism 12 disposed on an underside 14 of the removable vehicle seat 10A. The latching mechanism 12 may comprising a latch 28, a base 32, and a hinge 30. The latch can be configured to releasably engage a seat mounting member 34 of the vehicle, the seat mounting member 34 being secured to a floor of the vehicle. The base 32 can be configured to support the removable seat 10A when the seat 10A is placed on a surface outside of the vehicle. The hinge 30 can couple the latching mechanism 12 to the underside 14 of the removable seat 10A and can couple the latch 28 and the base 32 such that the base 32 and the latch 28 may project in a respective direction separated by an angle of between about 40 degrees and about 90 degrees. This degree of separation is indicated by θ in FIG. 5E. Further, the hinge 30 can be configured and coupled to the underside 14 of the seat 10A such that the latch 28 rotates in an upward direction toward the underside 14 of the seat 10A and the base 32 rotates in a downward direction away from the underside 14 of the seat 10A after the latch 28 is released from the seat mounting member 34 and such that the latch 28 rotates in a downward direction and the base 32 rotates in an upward direction before the latch 28 engages the seat mounting member 34. Therefore, in this embodiment, the base 32 of the latching mechanism 12 supports the removable seat 10A on a surface outside of a vehicle, rather than the plurality of legs described herein. Although it is not shown in the Figures, it is contemplated that a removable vehicle seat 10B may have a latching mechanism 12 as described above to support the seat 10B on a ground surface outside of a vehicle.

The vehicle to which an embodiment of the removable seat 10A/B is provided can be one of any various models of vehicles. For example, but not by way of limitation, the vehicle can be a minivan, a sport utility vehicle, or a crossover vehicle.

Figure 1:
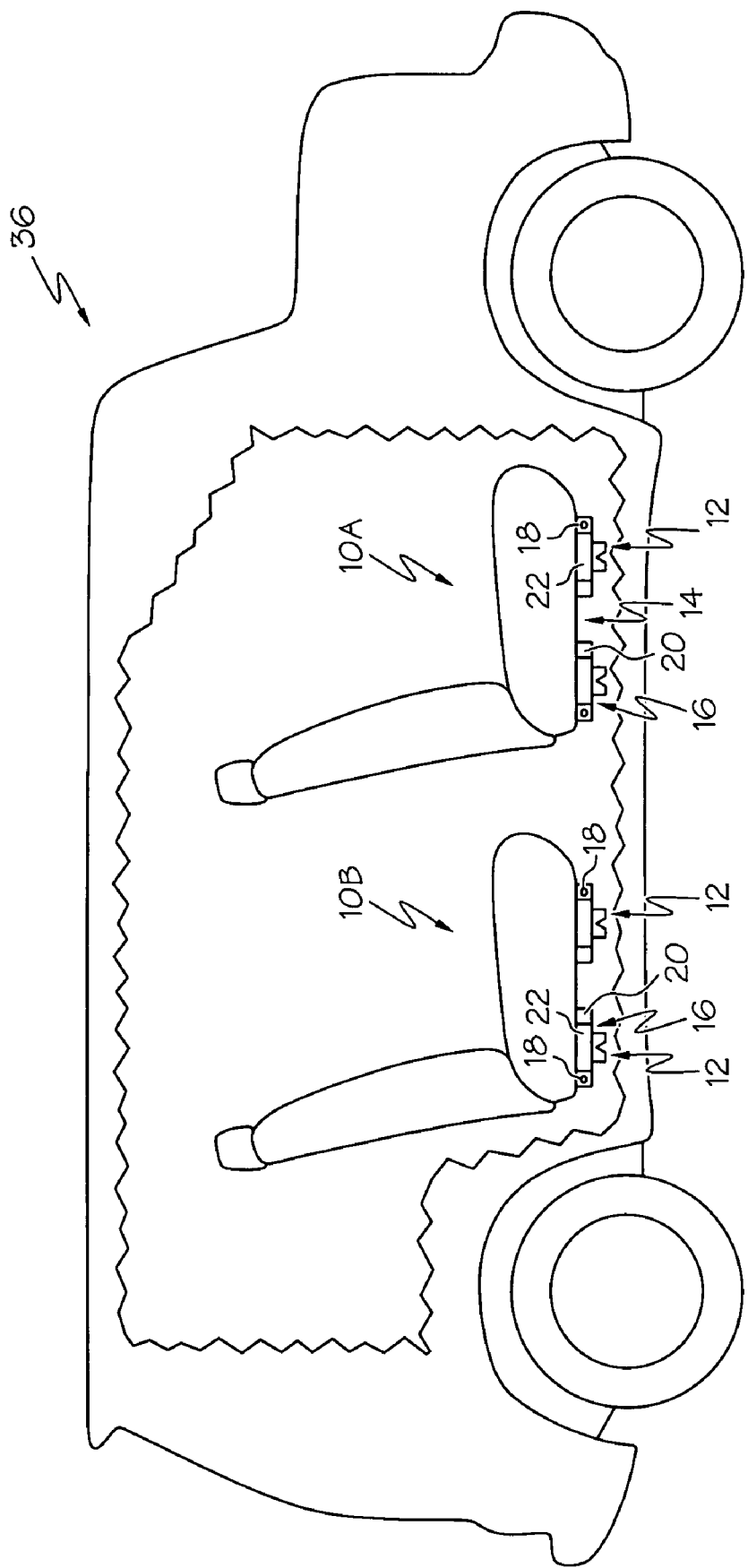
FIG. 1 is an illustration depicting a vehicle comprising exemplary removable vehicle seats, in accordance with multiple embodiments of the present invention.

According to yet another embodiment, shown in FIG. 1, the present invention generally relates to a vehicle 36 comprising an embodiment of a removable vehicle seat 10A/B operable for use outside of a vehicle 36. In accordance with a few embodiments, the vehicle can be a minivan, a sport utility vehicle, or a crossover vehicle.

In accordance with one embodiment of a removable vehicle seat, when the passenger, or user, exits the vehicle, the user can remove the seat from the vehicle by releasing the latching mechanism from a seat mounting member of the vehicle. After the user has released the latching mechanism from the seat mounting member, the plurality of legs can extend automatically, or be extended manually by the user, beyond the latching mechanism from the underside of the seat so that the legs can support the seat on a surface outside of the vehicle. The user, or another person, may then sit comfortably on the removable seat outside of the vehicle. After the user has relaxed and enjoyed the seat outside of the vehicle, the user may turn the seat on its side so as to fold the legs under the underside of the seat, above the latching mechanism and place the seat back inside of the vehicle where the seat may be engaged with the seat mounting members secured to the floor of the vehicle.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. Other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

What is claimed is:

1. A removable vehicle seat operable for use outside of a vehicle, the removable vehicle seat comprising:

a latching mechanism disposed on an underside of the removable vehicle seat, wherein the latching mechanism is configured to releasably engage a seat mounting member of the vehicle, the seat mounting member being secured to a floor of the vehicle; and a plurality of legs connected to the underside of the removable vehicle seat when engaged and disengaged from the seat mounting member, wherein at least one of the plurality of legs includes an extension moveably connected to the underside of the removable vehicle seat by a coupling mechanism that allows for rotation of the extension about an axis relative to the underside of the removable vehicle seat;

a base moveably connected to the extension such that the base can move toward and away from the extension;

the plurality of legs being configured to support the removable vehicle seat when the removable vehicle seat is placed on a surface outside of the vehicle.

2. The removable vehicle seat of claim 1, wherein the plurality of legs is configured to extend when the latching mechanism is released from the seat mounting member and to fold before the latching mechanism engages the seat mounting member.

3. The removable vehicle seat of claim 1, wherein the plurality of legs is configured to have a strength and a stability sufficient to support a person sitting on the removable vehicle seat outside of the vehicle.

4. The removable vehicle seat of claim 1, wherein the plurality of legs is configured to extend further than the latching mechanism from the underside of the removable vehicle seat so as to substantially prevent the latching mechanism from contacting the surface when the removable vehicle seat is placed on the surface outside of the vehicle.

5. The removable vehicle seat of clam 1, wherein each of the plurality of legs comprise a coupling mechanism configured to couple each of the plurality of legs to the underside of the removable vehicle seat.

6. The removable vehicle seat of claim 5, wherein the coupling mechanism is a hinge.

7. The removable vehicle seat of claim 1, wherein each of the plurality of legs further comprise a base hinge configured to couple the base and the extension such that the base folds behind the extension.

8. The removable vehicle seat of claim 1, wherein each of the plurality of legs is rotatably secured to the underside of the removable vehicle seat.

9. The removable vehicle seat of claim 1, wherein each of the plurality of legs is configured to rotate at least partially around a respective lateral axis such that:

each of the plurality of legs is configured to rotate in a downward direction when the latching mechanism is released from the seat mounting member; and each of the plurality of legs is configured to rotate in an upward direction before the latching mechanism engages the seat mounting member.

10. The removable vehicle seat of claim 1, wherein each of the plurality of legs is configured to rotate at least partially around a respective vertical axis to pivot the base around the vertical axis.

11. The removable vehicle seat of claim 1, wherein movement of the plurality of legs are controlled by a spring mechanism.

12. The removable vehicle seat of claim 1, wherein the plurality of legs comprises a locked and an unlocked orientation, wherein:

the locked orientation comprises the plurality of legs locked in an extended downward position; and the unlocked orientation comprises the plurality of legs unlocked from the extended downward position.

13. The removable vehicle seat of claim 1, wherein the plurality of legs is configured to fold underneath the underside of the removable vehicle seat before the latching mechanism engages the seat mounting member.

14. A removable vehicle seat operable for use outside of a vehicle, the removable vehicle seat comprising:

a latching mechanism disposed on an underside of the removable vehicle seat, wherein the latching mechanism is configured to releasably engage a seat mounting member of the vehicle, the seat mounting member being secured to a floor of the vehicle; and a plurality of legs rotatably disposed on the underside of the removable vehicle seat, wherein the plurality of legs are connected to the underside of the removable seat when engaged with the seat mounting member of the vehicle, the plurality of legs being configured to extend at a first pivot location after the latching mechanism is released from the seat mounting member and to fold at a second pivot location that is different than the first pivot location before the latching mechanism engages the seat mounting member, wherein the plurality of legs is configured to support the removable vehicle seat when the removable vehicle seat is placed on a surface outside of the vehicle.

15. The removable vehicle seat of claim 14, wherein each of the plurality of legs is configured to rotate at least partially around a respective lateral axis such that:

each of the plurality of legs is configured to rotate in a downward direction after the latching mechanism is released from the seat mounting member; and each of the plurality of legs is configured to rotate in an upward direction before the latching mechanism engages the seat mounting member.

16. The removable vehicle seat of claim 14, wherein the plurality of legs is configured to extend further than the latching mechanism from the underside of the removable vehicle seat so as to substantially prevent the latching mechanism from contacting the surface when the removable vehicle seat is placed on the surface outside of the vehicle.

17. A vehicle comprising the removable vehicle seat of claim 14.

18. A removable vehicle seat operable for use outside of a vehicle, the removable vehicle seat comprising:

a latching mechanism disposed on an underside of the removable vehicle seat, wherein the latching mechanism is configured to releasably engage a seat mounting member of the vehicle, the seat mounting member being secured to a floor of the vehicle; and a plurality of legs disposed on the underside of the removable vehicle seat, wherein the plurality of legs is configured to support the removable vehicle seat when the removable vehicle seat is placed on a surface outside of the vehicle;

wherein each of the plurality of legs is configured to rotate at least partially around a respective lateral axis such that:

each of the plurality of legs is configured to rotate in a downward direction when the latching mechanism is released from the seat mounting member; and each of the plurality of legs is configured to rotate in an upward direction before the latching mechanism engages the seat mounting member; and wherein each of the plurality of legs is configured to rotate at least partially around a respective vertical axis to pivot the base around the vertical axis.

19. The removable vehicle seat of claim 18, wherein each of the plurality of legs is configured to extend at a first pivot location after the latching mechanism is released from the seat mounting member and to fold at a second pivot location that is different than the first pivot location before the latching mechanism engages the seat mounting member.

* * * * *